July 4, 1939.  P. BROWER  2,164,639
GRAIN PLANTER
Filed Aug. 16, 1937  2 Sheets-Sheet 2

Inventor
Philip Brower

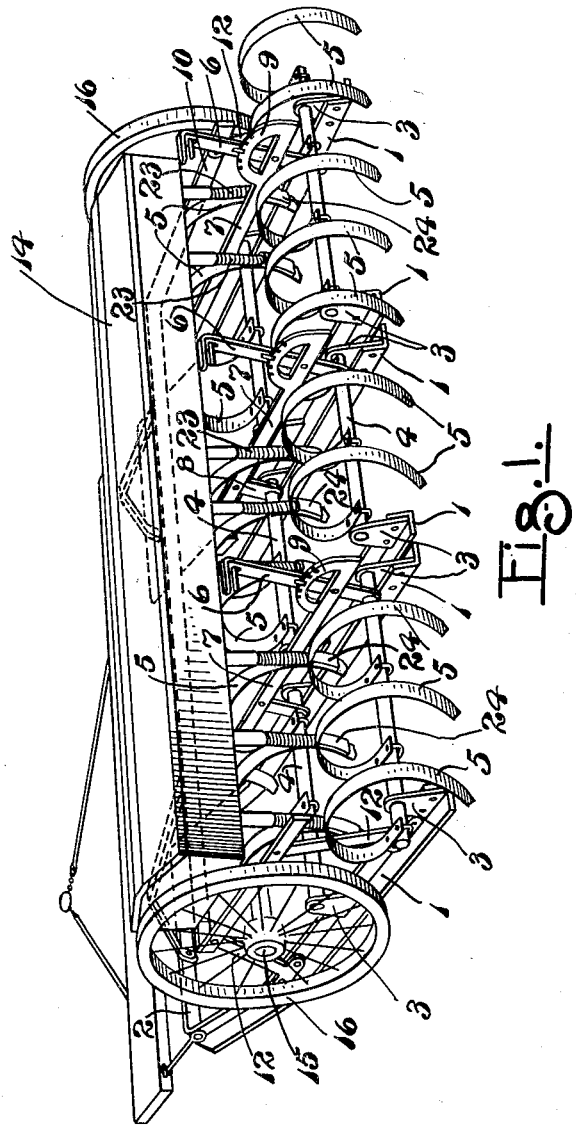

Patented July 4, 1939

2,164,639

UNITED STATES PATENT OFFICE 2,164,639

GRAIN PLANTER

Philip Brower, Caledonia, Mich.

Application August 16, 1937, Serial No. 159,270

1 Claim. (Cl. 111—70)

This invention relates to grain planting and is primarily concerned with the adaptation of a drill seed-box and delivery mechanism to a harrow, and the effective combination of the two so that there may be a simultaneous fitting of the ground to be planted, and a drilling of the seed in the ground and covering thereof so that the two operations of final fitting the ground and planting the seed are simultaneously performed.

Many times in fitting the ground for seeding, such as in drilling wheat, oats, corn and similar crops, the fitting being done by harrowing, there will be a complete harrowing and fitting of the ground ready for the drilling, but before the drilling can be accomplished, a rain occurs which requires a reharrowing of the ground in order to prepare it for the drilling. With my invention, the final harrowing with the simultaneous deposit of the seed saves not only a considerable additional work in refitting the ground which may occur many times, but further accomplishes the final harrowing and drilling of the seed at one operation, thereby saving the additional time which would be required for drilling as now performed.

The invention is directed to a practical, relatively simple and very useful construction for attaining the ends stated, as well as many others not at this time enumerated, but which will appear upon understanding of the invention from the following description taken in connection with the accompanying drawings, in which:

Fig. 1 is a perspective view of the combined harrow and drill of my invention.

Like reference characters refer to like parts in the different views of the drawings.

Figure 2:
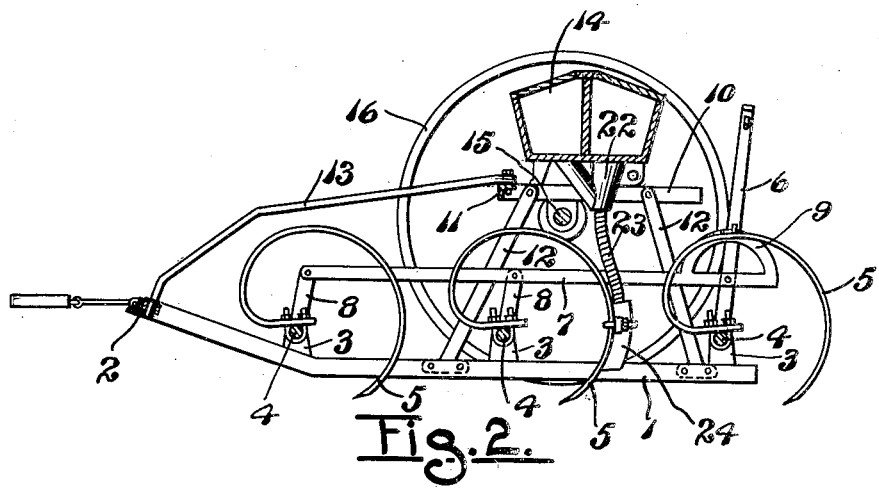
Fig. 2 is a vertical section and side elevation thereof, the section being taken from front to back of the machine.

With the invention, a conventional spring tooth harrow is used which may include a frame having a plurality of sections, each including spaced apart runners 1 which are connected at their front ends by a cross bar 2, the runners extending rearwardly from the cross bar. As shown, the runners are L-shaped in cross section and to their vertical legs a plurality of plates 3 are connected, between and through which, for each section, rock shafts 4 extend, on which the harrow teeth 5 are clamped with the usual U-bolt connections. A hand lever 6 is connected at its lower end to the rear-most rock shaft 4 of each of the harrow sections, and at a short distance above its lower end a horizontal bar 7 is pivotally secured, which bar extends forward over the front shafts 4 with which it has connection by links 8, best shown in Fig. 2, the links being permanently secured to the shafts 4 and pivotally connected to the bars 7. At the rear end each of the bars 7 is formed with a notched semi-circular quadrant 9 in the notches of which a movably mounted dog, mounted on the handle 6, is adapted to engage, so that the shafts may be rocked and retained in any position to which adjusted and thereby set the harrow teeth at greater or less depths relative to the frame shoes 1.

This is a conventional construction of a spring tooth harrow and upon it the seed delivering apparatus is mounted.

The seeding or drilling apparatus includes in the construction a U-shaped frame having horizontal side members 10, connected at their front ends by a bar 11. This frame is mounted above the harrow teeth, legs 12 being connected at their upper ends to the sides 10 at spaced apart points and extending downwardly to be detachably connected to the runners 1 at the ends of the harrow, as shown in Fig. 2. Likewise bars 13 extend between and are connected to the cross bars 2 and 11, thereby providing a rigid supporting structure for the elongated seed-box 14, which is located above and lengthwise of the harrow and over the bars 10, upon which it is mounted. In the illustration shown, the box 14 is a combined seeding and fertilizer drill box, but of course so far as the present invention is concerned, the fertilizing compartment is not at all essential.

Figures 3, 4:
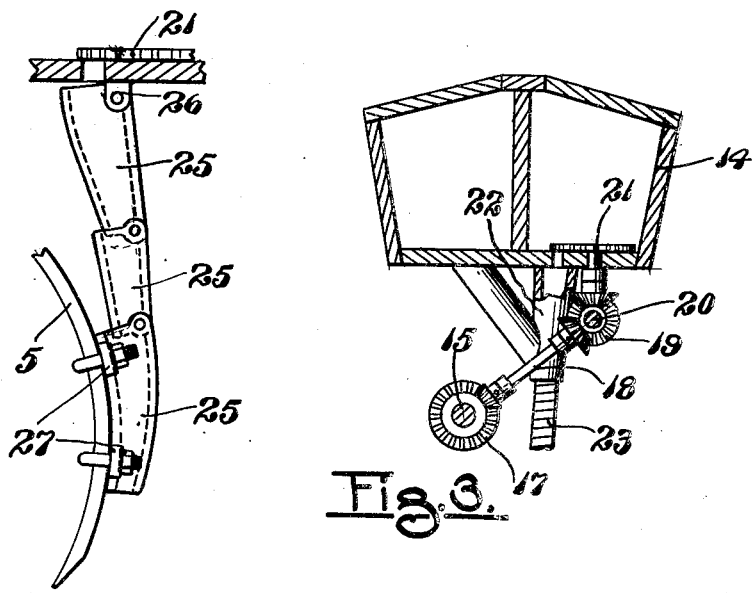
Fig. 3 is a fragmentary enlarged transverse section of the seed-box and a conventional form of seed feeding mechanism.
Fig. 4 is a side elevation of a modified form of seed dropping and guiding connection between the seed-box and harrow teeth.

A shaft 15 is mounted in suitable bearings upon and underneath the forward portion of the sides 10 of the frame described, and at its ends beyond the ends of the harrow the shaft is equipped with wheels 16, which on the forward movement of the wheels drive the shaft. The shaft 15 may be equipped with a beveled gear 17 and drive a shaft 18 through a beveled pinion connection with said shaft 18, which has beveled pinions at each end as shown in Fig. 3, the upper pinion driving a beveled gear 19 or a second longitudinal shaft 20, located lengthwise of and underneath the seed-box 14. The seed-box, at a plurality of spaced apart points in its length, has openings or holes in the bottom for the passage of the seed or grain which is to be deposited in the ground. For each of these openings a seed control mechanism, indicated at 21, is driven from the shaft 20 by suitable beveled gear and pinion connections therewith, thereby controlling the flow of the seed from the box through said openings downwardly into hollow sleeves 22 from the lower ends of which flexible hose 23 extend downwardly. The lower end of each of the hose 23 is loosely received in a guide 24, which is open from its upper to its lower end and which may be adjustably secured to a harrow tooth 5 at the rear side thereof and at a selected distance above the lower end of the tooth. The connection of the members 24 to the teeth 5 may be made in any suitable manner, such as by the U-bolts shown, or as an alternative this guide 24 may be formed integral with the tooth 5. The seed control mechanism is not novel with me and the structure shown in Fig. 3 is more or less incomplete and may be widely varied so as to be in accordance with any of the regular and conventional seed control mechanisms which are used in drilling.

In Fig. 4, instead of the sleeve 22 and the flexible hose 23, a plurality of tubular sections 25 are hingedly connected together, the uppermost section at its upper rear corner portion having a pivotal connection at 26 to the bottom of the seed-box 14 and the lowermost section being provided with laterally projecting ears 27 for the passage of the legs of U-bolts therethrough to clamp the same to the harrow tooth 5.

With this construction the various seed delivery hose 23 or the equivalent jointed sections 25 are operatively associated and connected with the intermediate harrow teeth 5 so as to drop the seed directly into the furrows dug by such teeth in the forward movement of the harrow. The front teeth 5 of the harrow dig up and harrow the ground ahead of the seed dropping, and the rear teeth cover the seed which has been dropped. The wheels 16 are against the ground and as the apparatus is moved forward, such wheels turn and operate the shaft 15. The seed-box with the attached seed dropping hose 23 or 25 may be removed from the apparatus when the harrow alone is to be used, or the entire connection consisting of the bars 13, the legs 12, the frame 10, 11 and the seed-box and hose may be disconnected to be reconnected when drilling is to take place.

The construction described is of very practical utility and secures in a simple manner the advantages which have been previously stated.

The invention defined in the appended claim is to be considered comprehensive of all forms of structure coming within its scope.

I claim:

In a construction of the class described, the combination of a harrow unit including a frame having a plurality of harrow teeth thereon, said frame being adapted to have a sliding movement over the ground, a seeding unit comprising supporting wheels contacting with and having a rolling movement over the ground, a shaft on which the wheels are carried, a frame on which the shaft is mounted, a seed box mounted on and above said frame, said seeding unit being independently movable on said wheels whereby the harrow may be moved into a position between the wheels and underneath the seed box, and said wheels carrying the weight of the shaft, seed box, seed therein and frame of the seeding unit, bracing means between said harrow frame and the seed unit frame connected to the seed unit frame and having a detachable connection to the harrow frame, said seed box having a plurality of outlets for the passage of seed, and flexible conduits connected to said seed box one for each outlet and at their lower ends having a detachable connection to harrow teeth between the front and rear portions of the harrow.

PHILIP BROWER.